US009912733B2

(12) United States Patent
T et al.

(10) Patent No.: US 9,912,733 B2
(45) Date of Patent: Mar. 6, 2018

(54) SYSTEM AND METHOD FOR MAINTAINING THE HEALTH OF A CONTROL SYSTEM

(71) Applicant: General Electric Company, Schenectady, NY (US)

(72) Inventors: Ravi Kumar T, Hyderabad (IN); Goutam Banerjee, Hyderabad (IN); Ramesh Brahmavar Pai, Hyderabad (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 470 days.

(21) Appl. No.: 14/448,164

(22) Filed: Jul. 31, 2014

(65) Prior Publication Data

US 2016/0033941 A1 Feb. 4, 2016

(51) Int. Cl.

| | |
|---|---|
| ***G05B 9/02*** | (2006.01) |
| ***H04L 29/08*** | (2006.01) |
| ***G06F 9/445*** | (2018.01) |
| ***G05B 19/042*** | (2006.01) |
| ***G05B 23/02*** | (2006.01) |

(52) U.S. Cl.

CPC .......... *H04L 67/10* (2013.01); *G05B 19/0428* (2013.01); *G05B 23/0283* (2013.01); *G06F 8/65* (2013.01); *H04L 67/12* (2013.01)

(58) Field of Classification Search

CPC ..... H04L 67/10; H04L 67/12; G05B 19/0428; G05B 23/0283

USPC ............................................................ 700/81

See application file for complete search history.

(56) References Cited

U.S. PATENT DOCUMENTS

| | | | |
|---|---|---|---|
| 4,051,669 A | 10/1977 | Yannone et al. | |
| 4,116,052 A | 9/1978 | Paluka | |
| 4,607,256 A * | 8/1986 | Henzel ............... | G06F 11/2005 340/9.1 |
| 4,642,782 A | 2/1987 | Kemper et al. | |
| 4,649,515 A | 3/1987 | Thompson et al. | |
| 5,508,897 A | 4/1996 | Van Order | |
| 5,508,997 A | 4/1996 | Katou | |

(Continued)

FOREIGN PATENT DOCUMENTS

| | | |
|---|---|---|
| CN | 100472509 C | 3/2009 |
| CN | 101714273 A | 5/2010 |

(Continued)

OTHER PUBLICATIONS

Trihedral, "SCADA Workstation Health Monitoring", VTScada Software for Monitoring & Control, http://www.trihedral.com/products/vts-hmi-software/systemhealthmonitoring/, pp. 1-2, retrieved on Jun. 16, 2016.

(Continued)

*Primary Examiner* — Ziaul Karim

(74) *Attorney, Agent, or Firm* — Douglas D. Zhang; GE Global Patent Operation

(57) ABSTRACT

Disclosed is a system and method to maintain the health of a control system. A recording of running status of process control system software is performed. Then a health assessment of a process control system is carried out using the recorded running status. Using this information, at least one health maintenance recommendation is generated. The recommendations are then implemented to maintain the health of a process control system.

18 Claims, 3 Drawing Sheets

(56) References Cited

U.S. PATENT DOCUMENTS 5,634,008 A 5/1997 Gaffaney et al.
6,006,171 A * 12/1999 Vines .................... G05B 15/02 700/83
6,188,962 B1 2/2001 Morgan et al.
6,199,018 B1 3/2001 Quist et al.
6,268,853 B1 7/2001 Hoskins et al.
6,356,199 B1 3/2002 Niziolek et al.
6,556,950 B1 4/2003 Schwenke et al.
6,615,090 B1 9/2003 Blevins et al.
6,618,856 B2 9/2003 Coburn et al.
6,633,782 B1 10/2003 Schleiss et al.
6,654,915 B1 11/2003 Lu et al.
6,671,659 B2 12/2003 Troia et al.
6,732,300 B1 * 5/2004 Freydel ................ G06F 11/184 714/10
6,738,683 B1 5/2004 Dunn
6,862,553 B2 3/2005 Schwenke et al.
6,931,288 B1 8/2005 Lee et al.
6,934,696 B1 8/2005 Williams et al.
6,990,432 B1 1/2006 McCarthy, IV et al.
6,993,456 B2 1/2006 Brooks et al.
7,089,452 B2 8/2006 Rubin et al.
7,092,771 B2 8/2006 Retlich et al.
7,146,232 B2 12/2006 Staron et al.
7,162,695 B2 1/2007 Zemore et al.
7,213,065 B2 5/2007 Watt
7,228,187 B2 6/2007 Tichy et al.
7,266,476 B2 9/2007 Coburn et al.
7,305,272 B2 12/2007 Maturana et al.
7,324,856 B1 1/2008 Bromley
7,392,426 B2 * 6/2008 Wolfe .................. G06F 11/184 714/11
7,395,188 B1 7/2008 Goebel et al.
7,451,351 B2 11/2008 Gunnmarker et al.
7,509,537 B1 3/2009 Jensen et al.
7,546,232 B2 6/2009 Brooks et al.
7,640,291 B2 12/2009 Maturana et al.
7,702,487 B2 4/2010 Sherrill et al.
7,729,886 B2 6/2010 Sherrill et al.
7,729,887 B2 6/2010 Sherrill et al.
7,774,293 B2 8/2010 Mosleh et al.
7,797,141 B2 9/2010 O'Connell et al.
7,840,336 B2 11/2010 Muramatsu et al.
7,870,379 B2 * 1/2011 Krieger .................... G06F 1/26 713/100
7,953,844 B2 5/2011 Deshpande
8,250,914 B2 8/2012 Sullivan
8,260,441 B2 9/2012 Scheegabeta et al.
8,312,040 B2 11/2012 Nyman
8,392,371 B2 3/2013 Lam
8,437,904 B2 5/2013 Mansouri et al.
8,903,520 B2 12/2014 Karaffa
9,043,263 B2 5/2015 McCarthy et al.
9,157,939 B2 10/2015 Kain et al.
9,201,113 B2 12/2015 McCarthy et al.
9,218,233 B2 12/2015 Venditti et al.
9,625,894 B2 * 4/2017 Kamenetz .......... G05B 19/0421
2001/0054095 A1 * 12/2001 Kampe ................ G06F 11/202 709/223
2002/0035495 A1 * 3/2002 Spira ..................... G06Q 10/04 705/7.36
2002/0066054 A1 5/2002 Jaw et al.
2002/0077849 A1 6/2002 Baruch et al.
2002/0108074 A1 8/2002 Shimooka et al.
2002/0120921 A1 8/2002 Coburn et al.
2002/0123864 A1 * 9/2002 Eryurek ............ G05B 23/0254 702/188
2002/0169734 A1 11/2002 Giel et al.
2003/0126202 A1 7/2003 Watt
2003/0182083 A1 9/2003 Schwenke et al.
2003/0231200 A1 12/2003 Zemore et al.
2004/0073404 A1 4/2004 Brooks et al.
2004/0073843 A1 4/2004 Dean et al.
2004/0098148 A1 5/2004 Retlich et al.
2004/0153437 A1 8/2004 Buchan
2004/0204772 A1 10/2004 Maturana et al.
2004/0205412 A1 10/2004 Staron et al.
2004/0250168 A1 12/2004 Tichy et al.
2004/0268186 A1 12/2004 Maturana et al.
2005/0015680 A1 1/2005 Rubin et al.
2005/0278670 A1 12/2005 Brooks et al.
2006/0026035 A1 2/2006 Younkes et al.
2006/0126608 A1 6/2006 Pereira et al.
2006/0174051 A1 8/2006 Lordi et al.
2007/0078628 A1 4/2007 Virji et al.
2007/0088570 A1 4/2007 Shetty et al.
2007/0093988 A1 * 4/2007 Chakraborty .......... G06Q 10/06 702/184
2007/0128895 A1 6/2007 Kleyer et al.
2007/0226543 A1 9/2007 Young et al.
2008/0141072 A1 6/2008 Kalgren et al.
2009/0055676 A1 2/2009 Wiebe
2009/0106589 A1 4/2009 Ramacher et al.
2010/0082125 A1 4/2010 Pingel et al.
2010/0146078 A1 6/2010 Wolff et al.
2010/0146341 A1 6/2010 Chen et al.
2010/0222900 A1 9/2010 Kakino et al.
2010/0324756 A1 * 12/2010 Fletcher ............. G05B 19/0428 701/3
2011/0040577 A1 2/2011 Ward
2011/0059427 A1 3/2011 Hans et al.
2011/0071692 A1 3/2011 D'Amato et al.
2012/0016607 A1 1/2012 Cottrell et al.
2012/0126539 A1 5/2012 Jacob
2012/0130553 A1 5/2012 Purani et al.
2012/0158205 A1 * 6/2012 Hinman ............. G05B 23/0216 700/297
2012/0159596 A1 * 6/2012 Vandevelde ...... H01L 31/02021 726/7
2012/0166007 A1 6/2012 Jeong et al.
2012/0266209 A1 10/2012 Gooding et al.
2012/0275899 A1 11/2012 Chandler
2013/0013523 A1 1/2013 Herrera
2013/0290729 A1 * 10/2013 Pettigrew ................ G06F 21/52 713/187
2013/0332383 A1 12/2013 Anzai et al.
2014/0025414 A1 1/2014 Worden et al.
2014/0031958 A1 1/2014 Loganathan et al.
2014/0032169 A1 1/2014 McCarthy et al.
2014/0114611 A1 * 4/2014 Moyne ................. G05B 23/024 702/183
2014/0304695 A1 * 10/2014 Gambardella .......... H04L 65/80 717/168
2015/0128293 A1 * 5/2015 Hitomi .................... H04L 65/60 726/29
2015/0186133 A1 * 7/2015 Yarra ..................... G06Q 10/00 717/121
2016/0048125 A1 * 2/2016 Cheta ................. G05B 19/4184 700/38
2016/0285694 A1 * 9/2016 Maes .................... G06F 9/5072

FOREIGN PATENT DOCUMENTS

CN 102123052 A 7/2011
CN 202100437 U 1/2012
FR 2947080 A1 12/2010
JP S62236008 A 10/1987
JP H03059703 A 3/1991
JP H07261823 A 10/1995
JP H11161321 A 6/1999
JP 2001282348 A 10/2001
JP 2010250819 A 11/2010
JP 2015522895 A 8/2015
WO 200150387 A1 7/2001
WO 2006138469 A2 12/2006

OTHER PUBLICATIONS

Karthikeyan Loganathan, et al., Jul. 24, 2012, U.S. Appl. No. 13/557,125.

(56) References Cited

OTHER PUBLICATIONS

Kevin Thomas McCarthy, et al., Jul. 24, 2012, U.S. Appl. No. 13/557,136.
GE Industrial Systems GEI-100483A, SPEEDTRONIC™ Mark VI Turbine Control Product Description, pp. 1-22, Jan. 10, 2002.
International Search Report and Written Opinion issued in connection with corresponding PCT Application No. PCT/US2013/046491 dated Sep. 26, 2013.
Khan et al: "Risk-based maintenance: a quantitative approach for maintenance/inspection scheduling and planning", Journal of Loss Prevention Industries,vol. No. 16, Issue No. 6, pp. 561-573, Oct. 20, 2013.
International Search Report and Written Opinion issued in connection with corresponding PCT Application No. PCT/US2013/045353 dated Oct. 2, 2013.
International Search Report and Written Opinion issued in connection with corresponding PCT Application No. PCT/US2013/050478 dated Jun. 27, 2014.
Non-Final Rejection towards corresponding U.S. Appl. No. 13/557,153 dated Jul. 1, 2014.
European Search Report issued in connection with related European Application No. 13742110.3 dated May 23, 2016.
Paul Venditti et al., Jul. 24, 2012, U.S. Appl. No. 13/557,083.
Karthikeyan Loganathan et al., Jul. 24, 2012, U.S. Appl. No. 13/557,125.
Kevin Thomas McCarthy et al., Jul. 24, 2012, U.S. Appl. No. 13/557,136.
Kevin Thomas McCarthy et al., Jul. 24, 2012, U.S. Appl. No. 13/557,148.
Kevin Thomas McCarthy et al., Dec. 17, 2012, U.S. Appl. No. 13/717,040.
Kevin Thomas McCarthy et al., Jul. 24, 2012, U.S. Appl. No. 13/557,153.
Unofficial English translation of CN Office Action issued in connection with corresponding CN Application No. 201380035043.7 dated Sep. 1, 2016.
Unofficial English translation of CN Office Action issued in connection with corresponding CN Application No. 201380035084.6 dated Sep. 30, 2016.
Unofficial English Translation of Japanese Search Report issued in connection with Related JP Application No. 2015524311 dated Apr. 18, 2017.
Unofficial English Translation of Japanese Office Action issued in connection with Related JP Application No. 2015524311 dated Apr. 25, 2017.

* cited by examiner

SYSTEM AND METHOD FOR MAINTAINING THE HEALTH OF A CONTROL SYSTEM

BACKGROUND OF THE INVENTION

The subject matter disclosed herein relates to a control system and more specifically to maintaining the health of a control system.

Control systems are used in process industries to control at least one process. Such processes can be continuous or discrete. Process industries may include, but are not limited to, power plants, process plants such as refineries, food and beverage industries and other industries where a process is required to be controlled. Control systems are designed to operate power plants and process plants continuously without the need for periodic shutdowns. Therefore managing the system health of a control system becomes vital, not only to keep the system running, but also to ensure that the corresponding plant keeps running safely and generates revenue. For example, in the case of a power plant running on gas turbines, a control system enables proper start-up, running and shut-down of a gas turbine. The control system also maintains the efficiency, optimization and safety of a gas turbine. The power plant may or may not use a gas turbine and may additionally use steam turbines, wind turbine, solar panels etc. If the control system functions improperly it may affect productivity, output and, in a worst-case scenario, a catastrophic accident may happen. Proper functioning of a control system is therefore of prime importance for proper functioning of a corresponding process plant.

BRIEF DESCRIPTION OF THE INVENTION

Embodiments of the invention relate to maintaining the health of a control system. The control system incorporates at least one industrial controller that communicates with a variety of field devices, including but not limited to flow meters, pH sensors, temperature sensors, vibration sensors, clearance sensors (e.g., measuring distances between a rotating component and a stationary component), pressure sensors, pumps, actuators, valves, and the like. In some embodiments, the industrial controller may be a triple modular redundant (TMR) Mark™ VIe controller system, available from General Electric Co., of Schenectady, N.Y. By including a plurality of processors in some embodiments, the TMR controller may provide for redundant or fault-tolerant operations. In other embodiments, the controller may include a single processor. The controller also includes software which contains the logic to run all these devices in a manner to control the process of a process plant.

Other embodiments of the invention include method of maintaining health of a process control system through a running status of a process control system software; performing a health assessment of a process control system using the recorded running status; generating at least one health maintenance recommendation based on the health assessment of the process control system; implementing at least one change in the process control system based on the recommendations. Implementations may include making hardware or software changes in a process control system or a combination thereof. Implementation may also include providing health recommendations to a user. User may or may not follow a particular recommendation to make any changes on a process control system. The control system may be communicatively coupled to process plant or industrial plant. The software that runs on the control system may require an update from its current running status. For example, if a new cyber security threat arrives that includes a new virus and the anti-virus was not part of the initial software, running status of the control system software can be analyzed to see if the update is required or not. The method thus can help protect control system from cyber attacks.

A further embodiment of the invention includes a computer readable storage medium having a computer program stored thereon and representing a set of instructions that when executed by a computer causes the computer to receive at least one health maintenance recommendation of a process control system; segregate said recommendation into upgradable during the running state of a process plant or non-upgradable during the running state of a process plant; and, implement on the process control system segregated information based on segregation determination.

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In certain embodiments, control of operations for an industrial process and associated machinery may be provided by a control system. In these embodiments, the control system may be implemented as a combination of hardware and software components suitable for receiving inputs (e.g., process inputs), processing the inputs, and deriving certain control actions useful in controlling a machinery or process, such as a power generation process, as described in more detail blow. However, known control systems often become less reliable over time due to aging hardware and software.

Certain corrective maintenance (CM) techniques may be used which are useful in repairing or updating the controller after an unexpected maintenance event. However, because the CM techniques are typically applied after occurrence of an unexpected event, the controlled process is normally stopped until the control system can be brought back to a desired normal operating condition. In contrast, the novel techniques described herein, including prognostic health monitoring (PHM) techniques, enable a preventative or predictive approach in which control system issues may be identified prior to their occurrence. Accordingly, corrective maintenance actions, such as control system upgrades, part replacements, supply chain order placement, and the like, may be performed in advance, and the control system may be maintained in an operational status for a longer duration. Indeed, stoppages of the controlled process and associated machinery may be substantially minimized or eliminated using embodiments of the invention.

Figure 1:
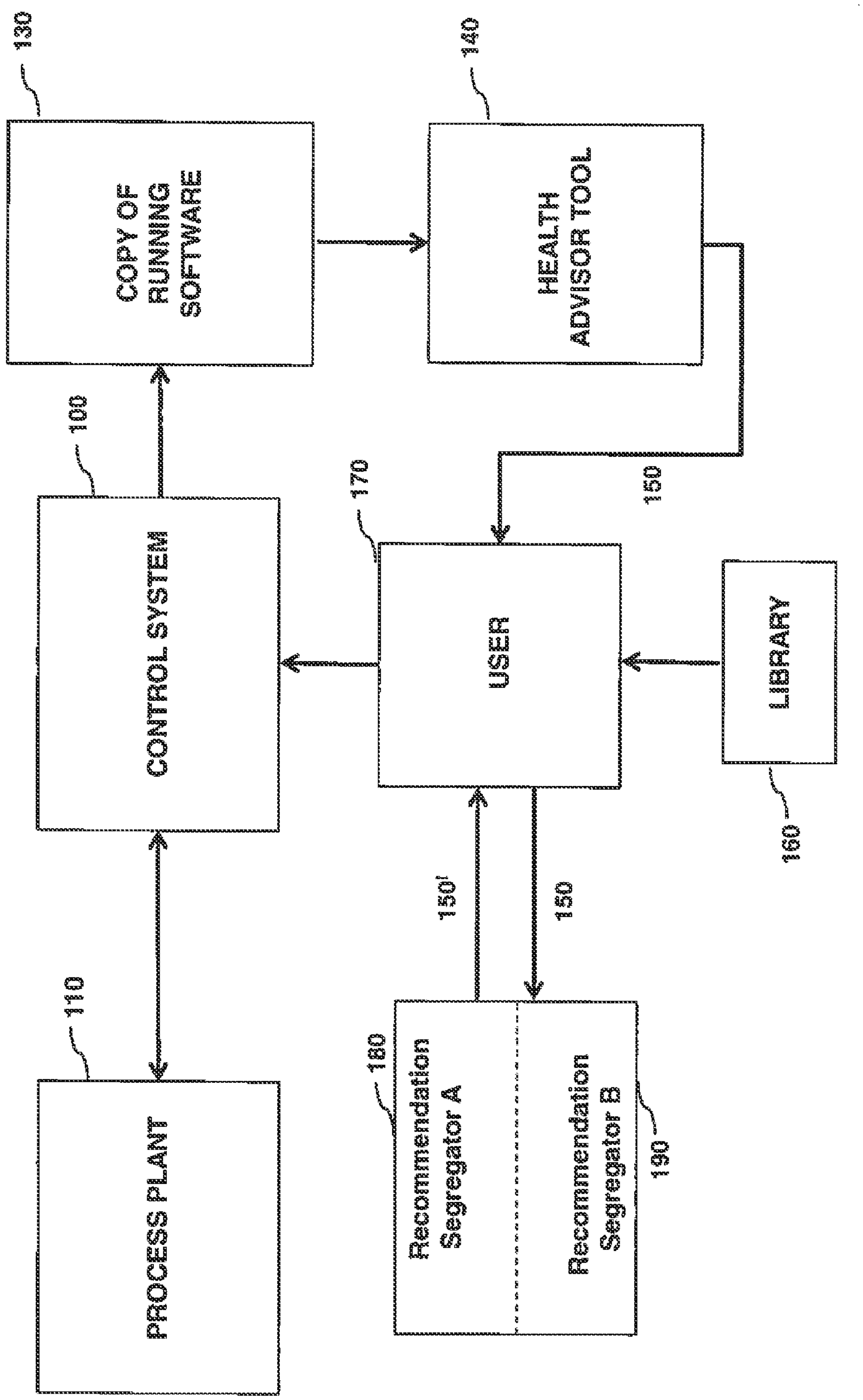
FIG. 1 is an information flow diagram of an embodiment of system of maintaining the health of a control system communicatively coupled to process plant.

FIG. 1 depicts a method of maintaining the health of a control system. Control system 100 controls the overall operation of a process plant 110. Control system 100 can also control specific units (not shown) within the process plant 110. For example control system 100 can control one or more gas turbines at a unit level within the process plant 110. Furthermore, in some embodiments control system 100 can also control at least one equipment units (e.g. gas turbine) and the entire process plant 110 (e.g. power plant) simultaneously. During running status of the process control system, at least one software is in communication with the process plant 110. The control system software not only provides input and output logic commands but maintains performance, cost, efficiency, security and safety of a process plant 110. Examples of software used in a control system 100 includes distributed control system (DCS) software, a manufacturing execution system (MES), a software for supervisor control and data acquisition (SCADA) system, a human machine interface (HMI) system software, an input/output system (e.g., I/O packs) software etc. The HMI, MES, DCS, SCADA and/or input/output software may be stored as executable code instructions stored on non-transitory tangible computer readable media, such as the memory of a computer. For example, the computer may host ControlST™ and/or ToolboxST™ software, available from General Electric Co., of Schenectady, N.Y.

Health assessment of the aforementioned control system 100 may be performed using a copy of recorded software. The control system 100 may include a computer system (not shown) suitable for executing a variety of control and monitoring applications, and for providing an operator interface through which an engineer or technician may monitor the components of the control system 100. Accordingly, a computer is used which includes a processor that may be used in processing computer instructions, and a memory that may be used to store computer instructions and other data. The computer system may include any type of computing device suitable for running software applications, such as a laptop, a workstation, a tablet computer, or a handheld portable device (e.g., personal digital assistant or cell phone). Indeed, the computer system may include any of a variety of hardware and/or operating system platforms. A computer is a used to run any of the aforementioned control system software.

The copy of the running software 130 can be stored on the same computer or can be stored on any other computer memory. The copy of the running software 130 can be transferred from one computer to another computer using a transitory computer readable medium. The copy can also be transferred using wireless means or using other communication channels such as Ethernet. Likewise, a file transfer mechanism (e.g., remote desktop protocol (rdp), file transfer protocol (ftp), manual transfer) may be used to indirectly send or to receive data, such as files.

Analysis of the recorded status is performed to assess the running health of a control system. The tool which can perform the health assessment may have attributes of a health advisor system 10 as shown in FIG. 2.

Figure 2:
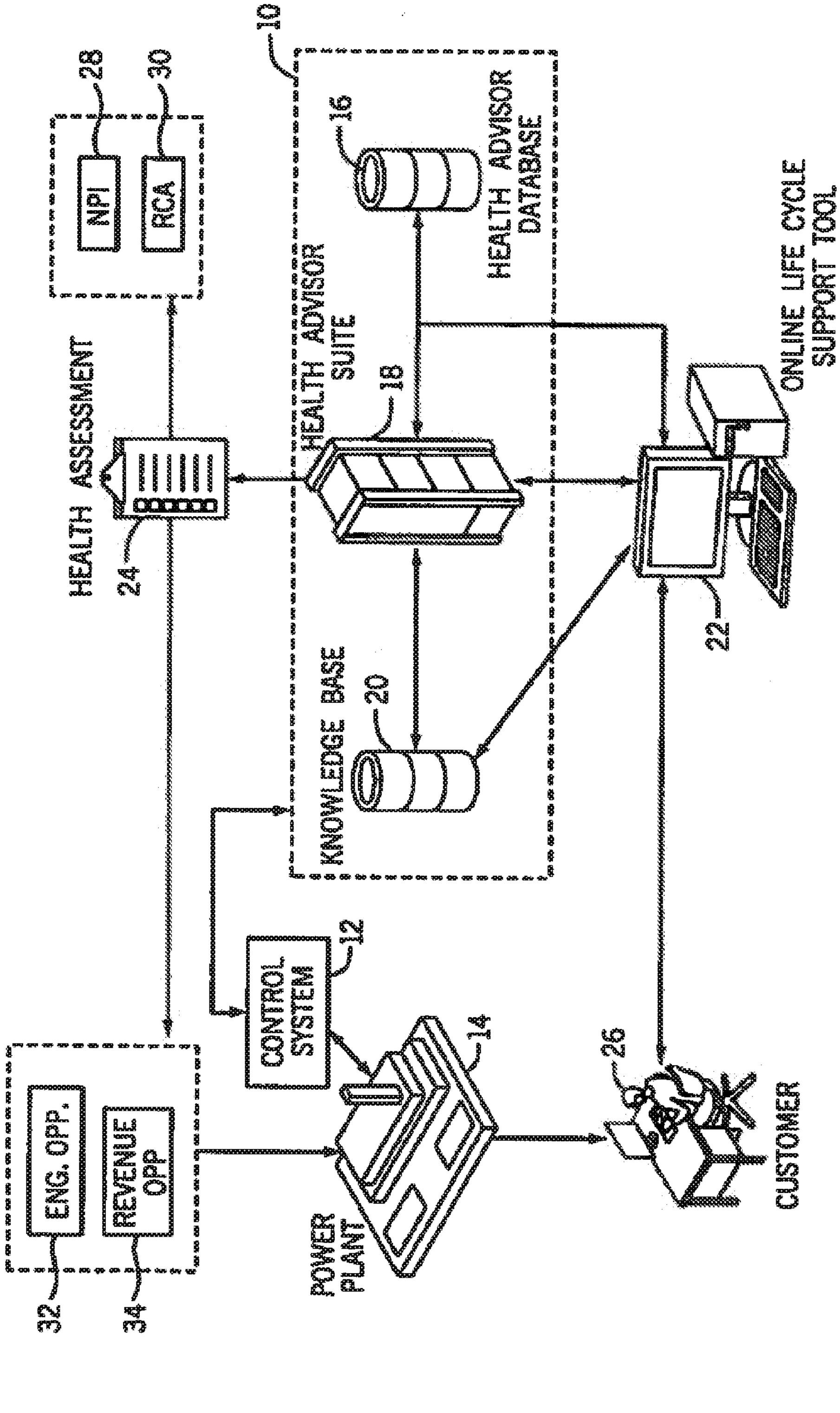
FIG. 2 is an information flow diagram of an embodiment of a control system health advisor communicatively coupled to a process plant including a control system.

With the foregoing in mind and turning now to FIG. 2, the figure is an information flow diagram illustrating an embodiment of a controller health advisor system 10 that may be communicatively coupled to a control system 12 (same as control system 100 of FIG. 1). The health advisor system 10 may include non-transitory code or instructions stored in a machine-readable medium and used by a computing device (e.g., computer, tablet, laptop, notebook, cell phone, personal digital assistant) to implement the techniques disclosed herein. The control system 12 may be used, for example, in controlling a process plant such as a power plant 14 (same as process plant 110 of FIG. 1). The power plant 14 may be any type of power producing plant 14, and may include turbomachinery, such as a gas turbine, a steam turbine, a wind turbine, a hydroturbine, a pump, and/or a compressor. It is to be noted that, in certain embodiments, the control system 12 may be used to control a variety of other machinery, and may be disposed in any industrial plant (e.g., manufacturing plant, chemical plant, oil refining plant). Further, the control system 12 may be used to control an industrial system including a gasification system, a turbine system, a gas treatment system, a power generation system, or a combination thereof.

The health advisor system 10 may include a health advisor database 16, a health advisor suite (e.g., suite of software and/or hardware tools) 18, and a knowledge base 20. The health advisor database 16 may store, for example, rule-based information detailing expert knowledge on the workings and possible configurations of the control system 12, as well as knowledge useful in making deductions or predictions on the health of the control system 12. For example, the health advisor database 16 may include expert system rules (e.g., forward chained expert system, backward chained expert system), regression models (e.g., linear regression, non-linear regression), fuzzy logic models (e.g., predictive fuzzy logic models), and other predictive models (e.g., Markov chain models, Bayesian models, support vector machine models) that may be used to predict the health, the configuration, and/or the probability of occurrence of undesired maintenance events (e.g., failure of a power supply, failure of a processor core, failure of an input/output [I/O] pack, insufficient memory, loose bus connection, etc.) related to the control system 12.

The knowledge base 20 may include one or more answers to control system 12 questions or issues, including answers relating to controller configurations, unexpected problems, known hardware or software issues, service updates, and/or user manuals. The health advisor suite 18 may update the knowledge base 20 based on new information, such as a control system health assessment 24. Additionally, an online life cycle support tool 22 is provided. The online life cycle support tool 22 may use the health advisor suite 18 and the knowledge base 20 to provide support to customers 26 of the power plant 14. For example, the customers 26 may connect to the online life cycle support tool 22 by using a web browser, a client terminal, a virtual private network (VPN) connection, and the like, and access the answers provided by the knowledge base 20, as well as the health advisor suite 18 and/or the health assessment 24, through the online life cycle support tool 22.

The online life cycle support tool 22 may similarly be used by other entities, such as a contract performance manager (CPM) tasked with administrating contractual services delivered to the plant 14, and/or a technical assistant (TA) tasked with providing information technology and/or other system support to the plant 14. For example, the plant 14 may be provided with contractual maintenance services (e.g., inspections, repairs, refurbishments, component replacements, component upgrades), service level agreements (SLAs), and the like, supported by the CPM and the TA.

The health assessment 24 may be used, for example, to enable a new product introduction (NPI) 28 and/or a root cause analysis (RCA) 30. For example, issues found in the health assessment 24 may aid in identifying issues related to the introduction (e.g., NPI 28) of a new hardware or software component for the control system 12, or the introduction of a newer version of the control system 12. The identified issues may then be used to derive the RCA 30. For example, the health advisor suite 18 may use techniques such as fault tree analysis, linear regression analysis, nonlinear regression analysis, Markov modeling, reliability block diagrams (RBDs), risk graphs, and/or layer of protection analysis (LOPA). The RCA 30 may then be used to re-engineer or otherwise update the control system 12 to address any issues found.

The health assessment 24 and/or the knowledge base 20 may also be used to derive engineering opportunities 32 and revenue opportunities 34. For example, controller usage patterns (processor usage, memory usage, network usage, program logs), issues found, frequently asked questions, and the like, may be used to derive engineering changes for the control system 12. The engineering changes may include changing memory paging schemes, memory allocation algorithms, applying CPU optimizations (e.g., assigning process priorities, assigning thread priorities), applying programming optimization (e.g., identifying and rewriting program bottlenecks, using improved memory allocation, using processor-specific instructions), applying networking optimizations (e.g., changing transmit/receive rates, frame sizes, time-to-live (TTL) limits), and so on.

Revenue opportunities 34 may also be identified and acted on. For example, the health assessment 24 may detail certain upgrades to the control system 12 based on a desired cost or budget structure, suitable for improving the performance of the control system 12. Upgrades may include software and/or hardware updates, such as newer versions of a distributed control system (DCS), a manufacturing execution system (MES), a supervisor control and data acquisition (SCADA) system, a human machine interface (HMI) system, an input/output system (e.g., I/O pack), a memory, processors, a network interface, a power supply, and/or a communications bus. By using the heath advisor suite 18 to derive the health assessment 24, the techniques described herein may enable a more efficient and safe power plant 14, as well as minimize operating costs.

The health advisor tool 140 in FIG. 1 has the attributes of health advisor system 10 of FIG. 2. Health advisor tool 140 may include a controller readiness, controller recommendations (e.g., software upgrade recommendations, software replace recommendations, hardware upgrade recommendations, hardware replace recommendations, parts replacement recommendations, parts ordering recommendations or a combination thereof), a configuration report, early warning reports (e.g., early warning outage reports), and access based reports (e.g., role-based access reports). The health advisor tool 140 may additionally include online and offline components, useful in performing the health assessment while the health advisor tool is communicatively coupled either directly to the control system, or coupled indirectly to the control system. Additionally, the health assessment may be provided in real-time or near real-time. The health assessment may be derived continuously and used to update or improve the control system, thus providing for an up-to-date prognosis of the health of the control system.

Health maintenance recommendations 150 can be provided by health advisor tool 140 based on the assessed health of the process control system. Recommendations 150 may include controller recommendations (e.g., software upgrade recommendations, software replace recommendations, hardware upgrade recommendations, hardware replace recommendations, parts replacement recommendations, parts ordering recommendations). Recommendations 150 are used to make changes or updates in a process control system. Recommendations 150 can be used by a user 170 to implement changes in a process plant. Such recommendations can be sent to user 170 on a computer device. Recommendations 150 can be sent through wireless or wired connection. Recommendations 150 can be a text file, a computer readable file, an audio file, a video file and combinations thereof. The format of recommendations 150 can be a text message, email, phone call, video message, voice message or a combination thereof. User 170 can be a user or operator of a process plant or a process control system. Additionally, user 170 can also be any machine or a device which can process, compute, analyze and transfer information. User 170 may provide recommendation 150 to recommendation segregator (a) 180 and recommendation segregator (b) 190. Recommendation segregator (a) 180 and recommendation segregator (b) 190 segregate the recommendation into upgradable or non-upgradable recommendations.

Figure 3:
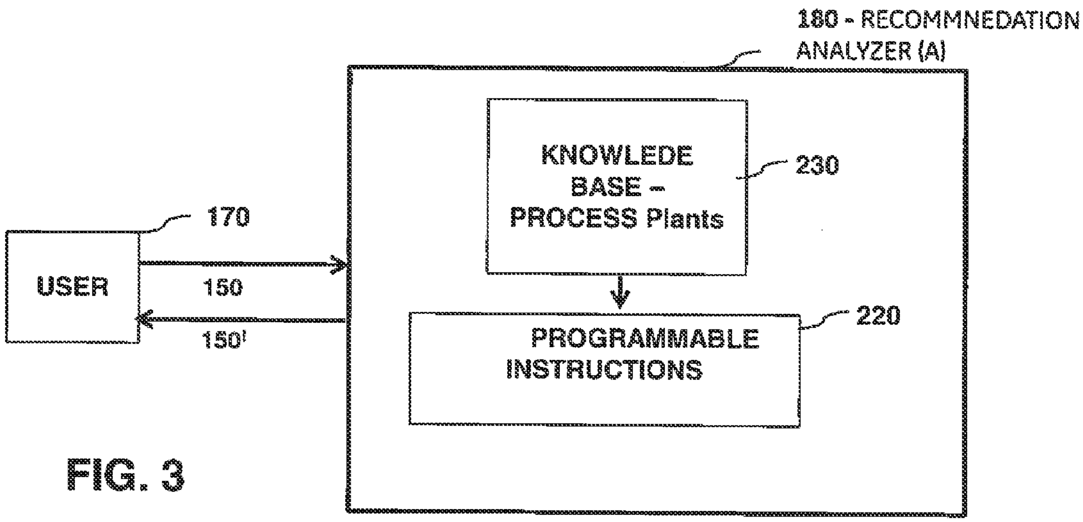
FIG. 3 is a schematic diagram of an embodiment of a wizard which maintains the health of a control system communicatively coupled to a process plant.

The decision whether particular software or hardware can be updated during the running stage of a process plant can be taken with the help of recommendation segregator (a) 180 as described in in FIG. 3. Recommendation segregator (a) 180 comprises a computer readable medium and capability of running programmable instructions 220. Programmable instructions contain logic derived from knowledge base 230 about the running of a process plant. The knowledge base 230 may include one or more answers to process plant questions or issues, including answers relating to process configurations, unexpected problems, known hardware or software issues, service updates, and/or user manuals. User 170 provides recommendations to recommendation segregator (a) 180 which then segregate the software or hardware upgrade recommendation into—upgradable during the running stage of process plant or non-upgradable during the running stage of process plant. Based on knowledge base 230, Recommendation segregator (a) 180 can segregate the software or hardware updates recommendation that can be updated during the running stage of a process plant. For example, software update which requires strategy change in air-fuel ratio of a power plant may not be performed during running stage of power plant because it may cause disruption or catastrophic accident in a power plant. Knowledge base 230 may have such kind of information and can be used while taking a decision. If the software is not ready to implement, the user can wait and update the software during shutdown period or downtime period.

The segregated recommendation information 150' is provided back to the user 170. Such recommendations can be sent to user 170 on a computer device. Recommendations can be sent through wireless or wired connection.

Figure 4:
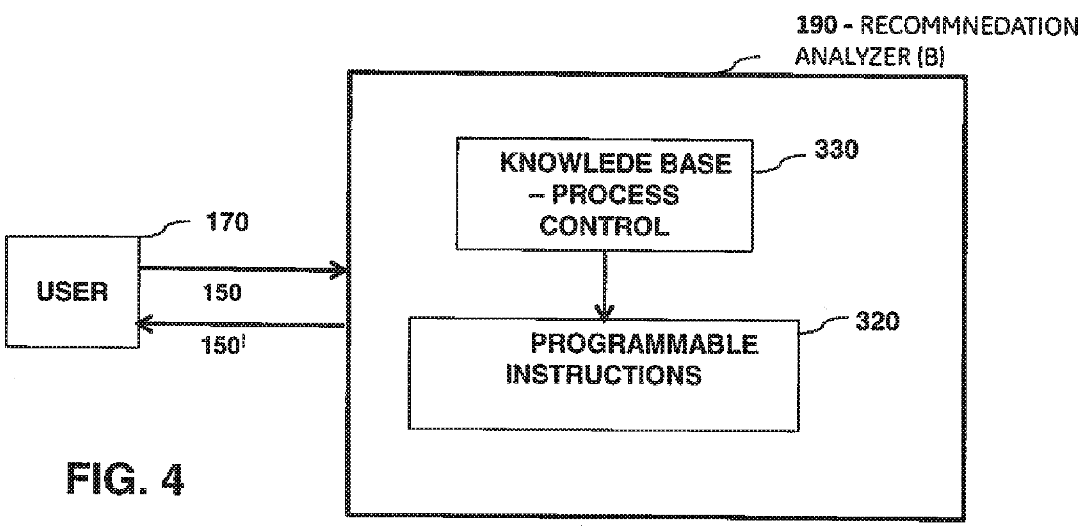
FIG. 4 is a schematic diagram of an embodiment of a wizard which maintains the health of a process plant.

The decision whether particular software or hardware can be updated during the running stage of a process control system can be taken with the help of recommendation segregator (b) 190 as described in in FIG. 4. Recommendation segregator (b) 190 comprises a computer readable medium and capability of running programmable instructions 320. Programmable instructions contain logic derived from knowledge base 330 about the running of a process control system. The knowledge base 330 may include one or more answers to process control questions or issues, including answers relating to controller configurations, unexpected problems, known hardware or software issues, service updates, and/or user manuals. User 170 provides recommendations to recommendation segregator (b) 190 which then segregate the software or hardware upgrade recommendation into—upgradable during the running stage of process control system or non-upgradable during the running stage of process control system. Based on knowledge base 330, recommendation segregator (b) 190 can segregate the software or hardware updates recommendation that can be updated during the running stage of a process control system. For example, software update which requires changes in ControlsST™ version provided by General Electric Company of Schenectady, N.Y. may not be performed during running stage because it may cause disruption or catastrophic accident in a process plant. Knowledge base 330 would have such kind of information and can be used while taking a decision. If the software is not ready to implement, the user 170 can wait and update the software during shutdown period or downtime period.

The segregated recommendation information 150' is provided back to the user 170. Such recommendations can be sent to user 170 on a computer device. Recommendations can be sent through wireless or wired connection.

User 170 has the choice of accepting or rejecting the recommendations 150'. User 170 may use plurality of criteria to decide if he/she requires such updates. The criteria may include cost considerations; availability of updates; time required to updates the software etc. User 170 may include the operator of process plant. If user accepts the recommendation the changes or updates in the software can be implemented. Implementing changes may also include non-software updates. Software may be downloaded in a control system using a computer readable medium device.

In another embodiment, the controller may be a redundant controller suitable for providing failover or redundant operations. In this embodiment, the controller may include three cores (or separate controllers), R, S, T, and may be referred to as may be referred to as a Triple Module Redundant (TMR) controller. The cores R, S, T may "vote" to determine the next action (e.g., step) to take in the control logic, based on the state information of each core R, S, T. The majority vote determines the selected action. For example, in using a state-voting algorithm, two of the controllers, e.g., controllers R and T, having the same state may "outvote" a third controller, e.g., controller S, having a different state. In this manner, the controller system may rely on the majority of cores as providing a more reliable state (and action) for the system being monitored and controlled.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of maintaining health of a process control system comprising:

recording a running status of process control system software of the process control system, the process control system being associated with a power plant;

performing a health assessment of the process control system using the recorded running status;

generating at least one health maintenance recommendation based on the health assessment of the process control system, wherein generating the at least one health maintenance recommendation comprises utilizing the health assessment of the process control system to make at least one prediction regarding a control system issue prior to occurrence of a maintenance event associated with the predicted control system issue, the at least one health maintenance recommendation comprising at least one corrective action to be performed to prevent occurrence of the maintenance event associated with the predicted control system issue;

segregating the at least one health maintenance recommendation into a first set of recommendations which are upgradable during the running status of the process control system and a second set of recommendations which are non-upgradable during the running status of the process control system, wherein the segregating is based on information associated with the power plant stored in a knowledge base; and implementing at least one change in the process control system based on the at least one health maintenance recommendation, wherein implementing the at least one change in the processing control system based on the at least one health maintenance recommendation comprises:

implementing, during the running status of the process control system, one or more recommendations in the first set; and implementing, during a shutdown or downtime period of the process control system, one or more recommendations in the second set; and wherein the process control system comprises at least one triple modular redundant (TMR) industrial controller configured to communicate with a plurality of field devices associated with the power plant, the TMR industrial controller comprising at least three cores; and wherein implementing the at least one change in the process control system based on the at least one health maintenance recommendation further comprises, prior to implementing the at least one change:

each of the at least three cores of the TMR industrial controller determining whether to implement the at least one change based on state information of that core; and determining whether to implement the at least one change based on a majority vote of the at least three cores of the TMR industrial controller.

2. The method of claim 1 wherein the process control system includes a power plant control system.

3. The method of claim 1 wherein generating the at least one health maintenance recommendation comprises generating one or more of controller health recommendations, software upgrade recommendations, software replacement recommendations, hardware upgrade recommendations, hardware replacement recommendations, parts replacement recommendations and parts ordering recommendations, and combinations thereof.

4. The method of claim 1 wherein the at least one health maintenance recommendation is sent as a notification to at least one user of the process control system.

5. The method of claim 4 wherein the notification is sent to the user via a wireless network.

6. The method of claim 4 wherein the notification comprises a text file, a computer readable file, an audio file, a video file and combinations thereof.

7. The method of claim 4 wherein the notification comprises a text message, email, phone call, video message, voice message or a combination thereof.

8. The method of claim 4 wherein the user has choice of accepting or rejecting the at least one health maintenance recommendation in the notification.

9. The method of claim 1 wherein implementing the at least one health maintenance recommendation includes downloading at least one software upgrade or software replacement.

10. The method of claim 9 wherein the software upgrade or software replacement comprises newer versions of a distributed control system (DCS), a manufacturing execution system (MES), a supervisor control and data acquisition (SCADA) system, a human machine interface (HMI) system, an input/output system, a memory, a processor, a network interface, a power supply, and a communications bus.

11. The method of claim 1 wherein generating the at least one health maintenance recommendation comprises generating at least one health report of the process control system.

12. The method of claim 1 further comprising receiving user input, wherein the user input includes providing one or more supporting files required to update the process control system software.

13. The method of claim 12 wherein the one or more supporting files include at least one software file.

14. The method of claim 12 wherein the one or more supporting files include at least one library of software.

15. A non-transitory computer readable storage medium having a computer program stored thereon and representing a set of instructions that when executed by a computer causes the computer to:

receive at least one health maintenance recommendation for a process control system associated with a power plant, the at least one health maintenance recommendation comprising at least one corrective action to be performed to prevent occurrence of a maintenance event associated with a predicted control system issue for the process control system;

segregate said recommendation into a first set of recommendations which are upgradable during a running state of the process control system and a second set of recommendations which are non-upgradable during the running state of the process control system, wherein the segregating is based on information associated with the power plant stored in a knowledge base; and implement at least one change in the process control system based on the segregated at least one health maintenance recommendation, wherein implementing the at least one change comprises:

implementing, during the running state of the process control system, one or more recommendations in the first set; and implementing, during a shutdown or downtime period of the process control system, one or more recommendations in the second set;

wherein the process control system comprises at least one triple modular redundant (TMR) industrial controller configured to communicate with a plurality of field devices associated with the power plant, the TMR industrial controller comprising at least three cores; and wherein implementing the at least one change in the process control system based on the at least one health maintenance recommendation further comprises, prior to implementing the at least one change:

each of the at least three cores of the TMR industrial controller determining whether to implement the at least one change based on state information of that core; and determining whether to implement the at least one change based on a majority vote of the at least three cores of the TMR industrial controller.

16. The storage medium of claim 15 wherein the segregated at least one health maintained recommendation is provided to at least one user of the process control system.

17. An apparatus comprising:

a controller implementing process control system software for a process control system, the process control system being associated with a power plant; and a knowledge base storing information associated with the power plant;

wherein the controller is configured:

to record a running status of the process control system software;

to perform a health assessment of the process control system using the recorded running status;

to generate at least one health maintenance recommendation based on the health assessment of the process control system, wherein generating the at least one health maintenance recommendation comprises utilizing the health assessment of the process control system to make at least one prediction regarding a control system issue prior to occurrence of a maintenance event associated with the predicted control system issue, the at least one health maintenance recommendation comprising at least one corrective action to be performed to prevent occurrence of the maintenance event associated with the predicted control system issue;

to segregate the at least one health maintenance recommendation into a first set of recommendations which are upgradable during the running status of the process control system and a second set of recommendations which are non-upgradable during the running status of the process control system, wherein the segregating is based on information associated with the power plant stored in the knowledge base; and to implement at least one change in the process control system based on the at least one health maintenance recommendation, wherein implementing the at least one change in the process control system based on the at least one health maintenance recommendation comprises:

implementing, during the running status of the process control system, one or more recommendations in the first set; and implementing, during a shutdown or downtime period of the process control system, one or more recommendations in the second set;

wherein the controller comprises at least one triple modular redundant (TMR) industrial controller configured to communicate with a plurality of field devices associated with the power plant, the TMR industrial controller comprising at least three cores; and wherein implementing the at least one change in the process control system based on the at least one health maintenance recommendation further comprises, prior to implementing the at least one change:

each of the at least three cores of the TMR industrial controller determining whether to implement the at least one change based on state information of that core; and determining whether to implement the at least one change based on a majority vote of the at least three cores of the TMR industrial controller.

18. The apparatus of claim 17 wherein the plurality of field devices comprise one or more flow meters, pH sensors, temperature sensors, vibration sensors and clearance sensors.

* * * * *